United States Patent [19]

Thomsen et al.

[11] Patent Number: 5,136,554
[45] Date of Patent: Aug. 4, 1992

[54] METHOD OF GEOPHYSICAL EXPLORATION

[75] Inventors: Leon A. Thomsen; Kenneth E. Hanson, both of Tulsa, Okla.; Mark V. Brumbaugh, South Haven, Mich.

[73] Assignee: Amoco Corporation, Chicago, Ill.

[21] Appl. No.: 576,550

[22] Filed: Aug. 31, 1990

[51] Int. Cl.$^5$ .................. G01V 1/34; G01V 1/053; G01V 1/36

[52] U.S. Cl. .................. 367/75; 367/31; 367/62; 364/421

[58] Field of Search .................. 367/31, 62, 75; 364/421, 924.5

[56] References Cited

U.S. PATENT DOCUMENTS

| | | | |
|---|---|---|---|
| 4,706,224 | 11/1987 | Alford | 364/421 |
| 4,803,666 | 2/1989 | Alford . | |
| 4,817,061 | 3/1989 | Alford et al. . | |
| 4,842,094 | 6/1989 | Willis et al. . | |
| 4,867,096 | 9/1989 | Cole . | |
| 4,871,045 | 10/1989 | Cole . | |
| 4,888,743 | 12/1989 | Thomsen . | |
| 4,922,472 | 5/1990 | Cole et al. | 367/189 |
| 4,933,913 | 6/1990 | Thomsen et al. | 367/75 |
| 4,995,008 | 2/1991 | Hornbostel et al. | 367/75 |

OTHER PUBLICATIONS

Shieh et al., "Ground Roll: Rejection Using Polarization Filters", Geophysics, V55, #9, pp. 1216-1222, Sep. 1990; Abst only provided.

Crompin, S., "Evaluation of Anisotrophy by Shear-Wave Splitting", Geophysics. vol. 50, #1, pp. 142-152, Jan. 1985; Abst only provided.

Lynn et al., "Reflection Shear-Wave Data . . . Anisotrophy" 5th Annu. Soc Explor. Geophys. Int. Mtg., Nov. 6, 1986 Abst. only provided.

*Primary Examiner*—Nelson Moskowitz
*Attorney, Agent, or Firm*—Timothy D. Stanley

[57] ABSTRACT

A method of geophysical exploration for acquiring and processing multicomponent seismic data obtained with seismic sources generating shear waves having time-varying polarizations and seismic receivers recording at least two modes of propagation of the imparted shear waves is provided. More particularly, a method is described for acquiring multicomponent seismic data with torsional seismic sources and multicomponent seismic receivers, as well as a method for processing such multicomponent seismic data so as to ameliorate the effects of shear wave splitting in displayed seismic data. Additionally, principal time-series signals can be obtained which are representative of formation properties along principal axes of an anisotropic formation essentially free of the effects of shear wave splitting.

16 Claims, 4 Drawing Sheets

5,136,554

METHOD OF GEOPHYSICAL EXPLORATION

BACKGROUND OF THE INVENTION

The present invention relates generally to a method of geophysical exploration and more particularly to novel methods for acquiring and processing multicomponent seismic data obtained with seismic sources generating shear waves having time-varying polarizations.

Exploration geophysicists have generally considered the earth's subsurface formations to be locally homogeneous and isotropic. However, exploration geophysicists have recently discovered that the assumptions about the general homogeneity and isotropy of the earth's subsurface formations are incorrect and that the earth's subsurface formations can exhibit pronounced anisotropy, particularly azimuthal anisotropy. Alford et al. in U.S. Pat. No. 4,817,061, Alford in U.S. Pat. No. 4,803,666, and Thomsen in U.S. Pat. No. 4,888,743, describe geophysical methods for acquiring and processing multicomponent seismic data to ameliorate the deleterious effects of formation anisotropy on seismic exploration.

Many seismic sources, such as described by Willis et al. in U.S. Pat. No. 4,842,094, are considered as having fixed polarizations when they impart seismic energy into the earth, although they have the capability of imparting shear waves polarized along any selected polarization. With the advent of torsional seismic sources generating elliptically polarized shear waves as described by Cole in U.S. Pat. Nos. 4,867,096 and 4,871,045, we have discovered a novel method of geophysical exploration which can have a substantial impact on the acquisition and processing of multicomponent seismic data, especially in areas where the earth's subsurface formations exhibit azimuthally anisotropic characteristics. More particularly, the multicomponent seismic acquisition methods can be simplified. Consequently, the time required to collect multicomponent seismic data can be greatly reduced. These and other benefits of the present invention will be further described in more detail below.

SUMMARY OF THE INVENTION

According to the present invention, a method of geophysical exploration is provided whereby shear wave seismic energy having a time-varying polarization is imparted into the earth with a torsional seismic source and a first set of seismic signals representative of the earth's response thereto is recorded with sets of seismic receivers responsive to at least first and second modes of shear wave propagation of the imparted seismic energy. The first set of seismic signals can then be processed so as to ameliorate the effects of shear wave birefringence and obtain principal time-series signals essentially free of the effects of shear wave splitting. Additionally, principal time-series signals can be obtained which are representative of formation properties along principal axes of an anisotropic formation essentially free of the effects of shear wave splitting. The step of imparting seismic energy into the earth can be repeated with a torsional seismic source, having an opposite polarity to that originally employed, and a second set of seismic signals representative of the earth's response thereto can be recorded with the sets of seismic receivers. By combining the first and second sets of seismic signals, one can ameliorate the deleterious effects of shear wave birefringence to obtain principal time-series signals essentially free of the effects of shear wave splitting and obtain a measure of the azimuthal orientation of the principal axes of anisotropic subsurface formations.

As such, the present invention provides a novel method of geophysical exploration especially in providing novel methods for acquiring and processing multicomponent seismic data. Specifically, more simplified seismic source operation and seismic receiver positioning can be employed to ensure the acquisition of multicomponent seismic signals wherein the seismic receivers record the earth's response to at least two modes of shear wave propagation of the imparted seismic energy. Thereafter, the recorded seismic signals can be processed to ameliorate the effects of shear wave splitting in displayed seismic data, as well as to obtain principal time-series signals representative of the earth's properties along principal axes of an anisotropic formation using either a priori or analytically derived knowledge of the azimuthal orientation of the principal axes of the anisotropic formation.

These and other advantages of the present invention will be apparent from the following detailed description of accompanying drawings.

A BRIEF DESCRIPTION OF THE DRAWINGS

DETAILED DESCRIPTION OF THE INVENTION

I. Introduction

Figure 1:
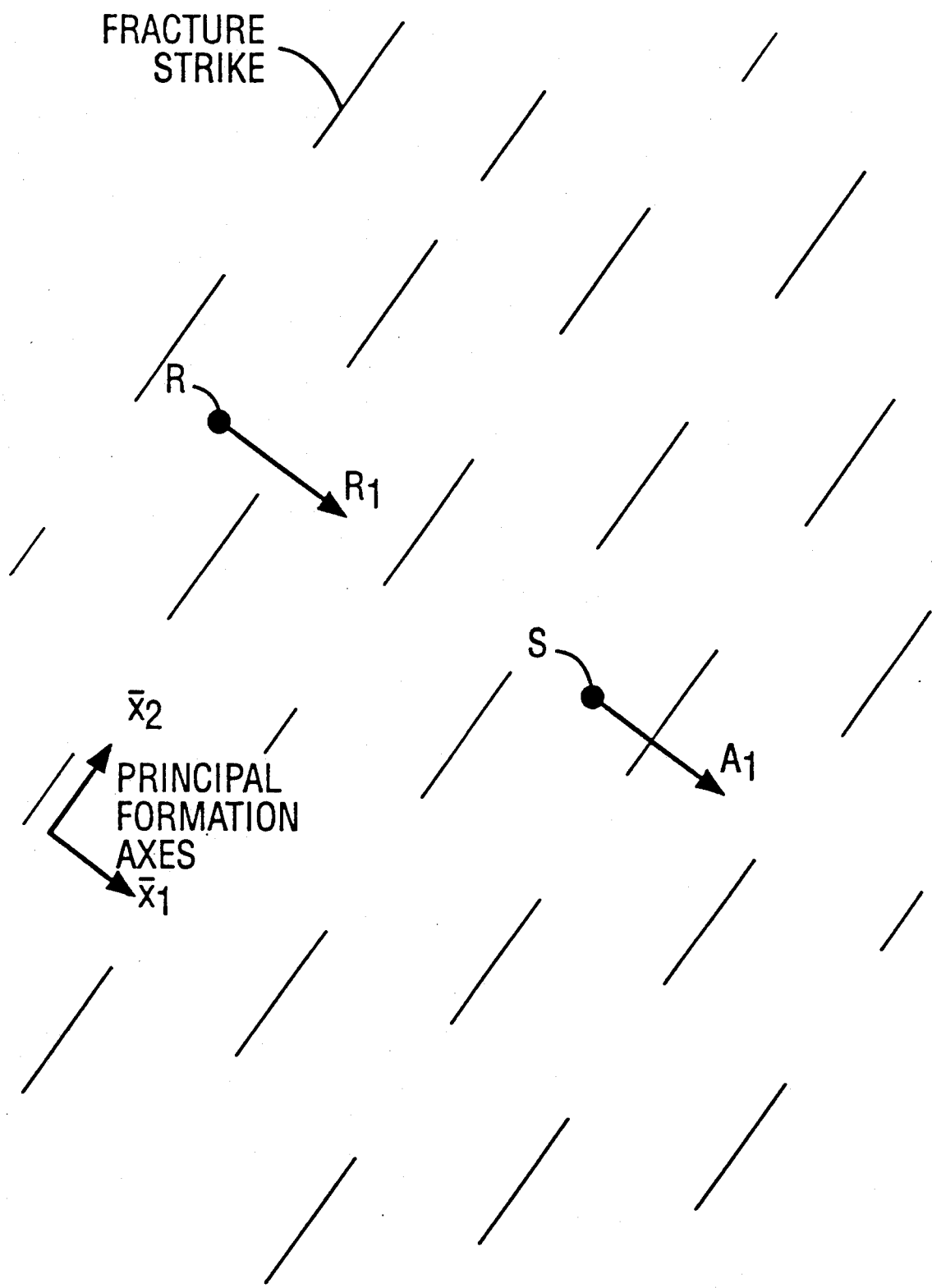
FIG. 1 is a plan view of a seismic source S imparting shear wave energy $\overline{A}_1$ polarized parallel to the $\overline{x}_1$ axis of an anisotropic formation and a seismic receiver R having a polarization parallel $R_1$ to the $\overline{x}_1$ axis.

At the outset, brief introductory remarks are provided as an overview to assist in understanding the present invention. When formations at depth are fractured or cracked, the fractures are often oriented nearly vertically, and with one (or more) preferred azimuth. Moreover, oriented fractures in formations usually make the formations anisotropic, i.e., the rock properties vary with direction. If there is a regional tectonic stress or paleo-stress, the fractures can be oriented nearly parallel with their planar surfaces substantially perpendicular to the horizontal direction of least compressive stress. Such formations can be characterized by a vector, perpendicular to the planar surfaces of such cracks or fractures, which is called the unique axis. Formations are considered to be azimuthally anisotropic if formation properties vary with azimuthal direction. Although such parallel fracture systems are used as an exemplar of azimuthal anisotropy, it is understood that the following discussion is germane to other causes of azimuthal anisotropy.

In the present invention, the differences in formation characteristics with respect to various azimuthal directions (e.g., in the shear modulus, shear velocity, etc.) of azimuthally anisotropic formations can be advantageously employed. For example, if shear waves travel vertically in an azimuthally anisotropic formation so that the polarization (i.e., the direction of particle motion) of the imparted shear wave is substantially parallel to the fracture strike, the shear wave propagates at substantially the shear velocity of the unfractured formation. However, if the shear waves travel vertically in the azimuthally anisotropic formation so that the polarization of the imparted shear wave is substantially perpendicular to the fracture strike, then the shear wave propagates at a velocity which depends upon a combination of formation and fracture properties, and which can be noticeably less than the shear wave velocity of the unfractured formation itself. When shear waves are imparted vertically into an azimuthally anisotropic formation so that the polarization of the imparted shear wave is oblique to the fracture strike, the shear wave is "split" into two separate components, i.e., one parallel with the unique axis and the other perpendicular thereto. Such shear wave "splitting" is sometimes called shear wave birefringence.

Only transversely isotropic formations are considered explicitly in this explanatory discussion, although more general anisotropic media will show similar effects. Transversely isotropic media have one unique axis and two equivalent axes (both at right angles to the unique axis). The unique axis may or may not be horizontal. Formation anisotropy is most commonly due to:

(1) homogeneous but anisotropic beds (typically shales) which have a preferred orientation of mineral grains, due to settling under gravity;

(2) isotropic beds, thinly layered, so that a sound wave with a wave length much longer than the layer thicknesses averages over many layers and propagates as if in a homogeneous, anisotropic media;

(3) horizontal fractures, if the layer is not deeply buried; and/or (4) vertical fractures whose planar surfaces are oriented randomly in all horizontal directions.

(5) vertical fracture whose planar surfaces are oriented preferentially in a particular horizontal direction.

These effects may be present in any combination; however, only condition (5) leads to azimuthal anisotropy in horizontal beds.

Transversely isotropic formations generally have their unique axis vertical, because the direction of gravity is the ultimate cause of anisotropy. However, in the case where transverse isotropy occurs in regions having some tectonic stress, a preferred horizontal direction is imparted to the fractures. In such a setting, tensile fractures may open with their planar surfaces perpendicular to the direction of least compressive stress. If the formation is otherwise isotropic, such fractures create a transversely isotropic medium whose unique axis is horizontal. Formations exhibiting such characteristics are considered to be azimuthally anisotropic. The effects of anisotropy on shear wave propagation can be used according to the present invention to detect and characterize the presence of azimuthally anisotropic formations, and to resolve their deleterious effect in seismic data quality.

To aid in the following discussion, the symbols in the table below have been employed:

TABLE I $\bar{x}_i$ are principal axes, $\bar{x}_1$, $\bar{x}_2$ of an anisotropic formation;

$\bar{x}$ and $\bar{y}$ are orthogonal axes generally at an arbitrary angle $\Theta$ to the principal axes $\bar{x}_i$;

A is the amplitude of the imparted shear wave seismic energy;

$\bar{A}_i$ is a component of the shear wave energy imparted along the $\bar{x}_i$ axis of the anisotropic formation;

$\bar{A}_\theta$ is a component of the shear wave energy imparted at an arbitrary angle $\theta$ to the $\bar{x}_i$ axis of the anisotropic formation;

$f_i(t)$ is the earth filter along the $\bar{x}_i$ axis of the anisotropic formation;

$r_i(t)$ is the principal reflectivity series for shear waves polarized along the $\bar{x}_i$ axis of the anisotropic formation;

$r_i(t) = f_i(t) * r_i(t)$ w(t) is the seismic wavelet of the imparted shear wave;

$S_i(t)$ is the principal time-series signal along the $\bar{x}_i$ axis of the anisotropic formation; and

* is a symbol representing the mathematical operation of convolution.

II. Effects of Anisotropy on the Propagation of Seismic Energy

Whenever a seismic survey is conducted over a formation which is anisotropic, the moveout velocity obtained by standard methods may not be equal to the vertical velocity of the medium. This is true even in the absence of layering and dip of reflectors. The moveout velocity differs from vertical velocity simply because of the angular dependence of the wave velocity. The true vertical velocity can be used along with vertical travel time to determine a depth to or thickness of a given bed, i.e., to convert a time section to a depth section. Hence, if the moveout velocity is naively taken to be equal to the vertical velocity, a misestimation of depth and/or thickness may result. The discussion below pertains to the true vertical velocity and not the apparent or moveout velocity.

A. Compressional Wave

The geometry for this example can be best understood with the help of an analogy. Imagine that an azimuthally anisotropic formation can be represented by a thick deck of cards, standing on their edges. The empty planes between the cards represent fractures and the deck is oriented so the edges of the cards show on two ends and the top of the deck. Placing one's open hand on the top of the deck represents a vertically incident compressional (P) wave front. As the hand oscillates up and down simulating a compressional wave or longitudinal particle displacement, the deck deforms only with difficulty. The fractures have not substantially weakened the deck; to deform the deck requires that the cards themselves (analogous to the uncracked formations) must be deformed. The high resistance to longitudinal deformation implies a large longitudinal elastic modulus and hence a large longitudinal velocity.

B. Shear Wave

Referring again to the deck of cards analogy, horizontal oscillations of the hand can represent a vertically incident shear wave front. For hand oscillations generally parallel to the length of the cards, the deck again deforms only with difficulty. As discussed before, the fractures do not weaken rock for this component of strain. Hence, the effective shear modulus $\mu_2$ and the shear velocity $\beta_2$ are high. However, horizontal hand oscillations generally perpendicular to the length of the cards cause the deck to deform easily in shear. The spaces between the cards, i.e., the fractures, allow the cards to slide past one another. The low resistance to shear implies a low shear modulus $\mu_1$ and hence a low shear velocity $\beta_1$.

The contrast between the shear velocities $\beta_2$ and $\beta_1$ in the card analogy is greater than the contrast found for the azimuthally anisotropic formations (because the fractures in the anisotropic formations are not continuous throughout the region as in the deck of cards); however, the principle is the same.

For horizontal hand oscillation generally at an oblique angle to the length of the deck of cards, the particle displacements of the shear wavefronts do not coincide with the principal axes of the deck of cards, and the shear waves are subjected to shear wave birefringence or "splitting." That is, the shear wave displacements are resolved into two components, one along the deck of cards unique axis, i.e., $\bar{x}_1$, (perpendicular to the cards) and the other along the axis perpendicular thereto, i.e., $\bar{x}_2$ (parallel to the card edges). As a consequence, the imparted shear wave energy encounters two different shear moduli, i.e., one ($\mu_1$) perpendicular to the planes of symmetry, and the other ($\mu$2) parallel to the planes of symmetry. The "split" shear wave energy will travel at two different velocities ($\beta_1$, $\beta_2$, where $\beta_1 < \beta_2$) through the anisotropic formation. It is important to understand that oblique polarization results in this splitting, and not in unsplit propagation at some intermediate velocity.

III. Effect of Anisotropy on Recorded Seismic Signals

A. Shear Wave Seismic Source Having a Fixed Polarization

Azimuthally anisotropic formations can be considered to have different reflectivity series as a function of azimuth. For example, $r_1(t)$ can describe the reflectivity series for shear waves polarized parallel to the unique axis of the azimuthally anisotropic formation (i.e., along the $\bar{x}_1$ axis) and $r_2(t)$ can describe the reflectivity series for the azimuthally anisotropic formation for shear waves polarized perpendicular to the unique axis (i.e., along the $\bar{x}_2$ axis). Because of the differences in shear wave velocities according to each of the two principal polarizations, the downgoing shear wavefronts encounter the same layer interface at different times, resulting in differing recorded reflections. The reflectivity series $r_1(t)$ can appear as a scaled (in amplitude) and stretched (in time) version of $r_2(t)$, in the simple case where the orientation of anisotropy (e.g., of fractures) is uniform with depth. The seismic signals recorded by a geophone can be described as the convolution of the imparted seismic wavelet with the appropriate reflectivity series and with a filter which takes into account dispersion, attention, etc. of the earth's formations.

The effects of azimuthally anisotropic formations on the propagation of seismic wave energy can be seen most vividly in the signals recorded using seismic source/geophone pairs having various fixed polarizations with respect to the principal axes ($\bar{x}_1$, $\bar{x}_2$) of the anisotropic formation. In a first example depicted in plan view in FIG. 1, a seismic source S is adapted to impart shear wave seismic energy with displacement $\bar{A}_1$ parallel to the $\bar{x}_1$ axis of the formation according to:

$$A_1 = A \cdot w_1(t) x_1 \tag{1}$$

where
 A = amplitude of the imparted shear wave displacement and
 $w_1(t)$ = wavelet of the imparted shear wave.

In this and subsequent figures, the indicated "fracture strike" denotes the direction of polarization of the fast shear wave in the anisotropic formation, whether or not the anisotropy is caused by a single set of oriented fractures.

A similar analysis could also be provided using a shear wave source having the same amplitude and wavelet, and a fixed horizontal line of action parallel to the $\bar{x}_2$ axis, i.e., $$A_2 = A \cdot w_2(t) x_2 \tag{2}$$

Responsive to imparted shear wave $\bar{A}_1$ a seismic receiver R having a matching horizontal polarization $R_1$ to that of the imparted shear wave $\bar{A}_1$ (i.e., parallel to the $\bar{x}_1$ axis) will record the following signal:

$$R_1(t) = A \cdot f_1(t) * w_1(t) * r_1(t) \tag{3}$$

where the filter $f_1(t)$ accounts for dispersion, attenuation, etc.

If the seismic receiver R polarization in FIG. 1 is orthogonal to the polarization of the imparted shear wave $\bar{A}_1$ (i.e., parallel to the $\bar{x}_2$ axis of the formation) no signal would be recorded, i.e., $R_2(t) = 0$.

Figure 2:
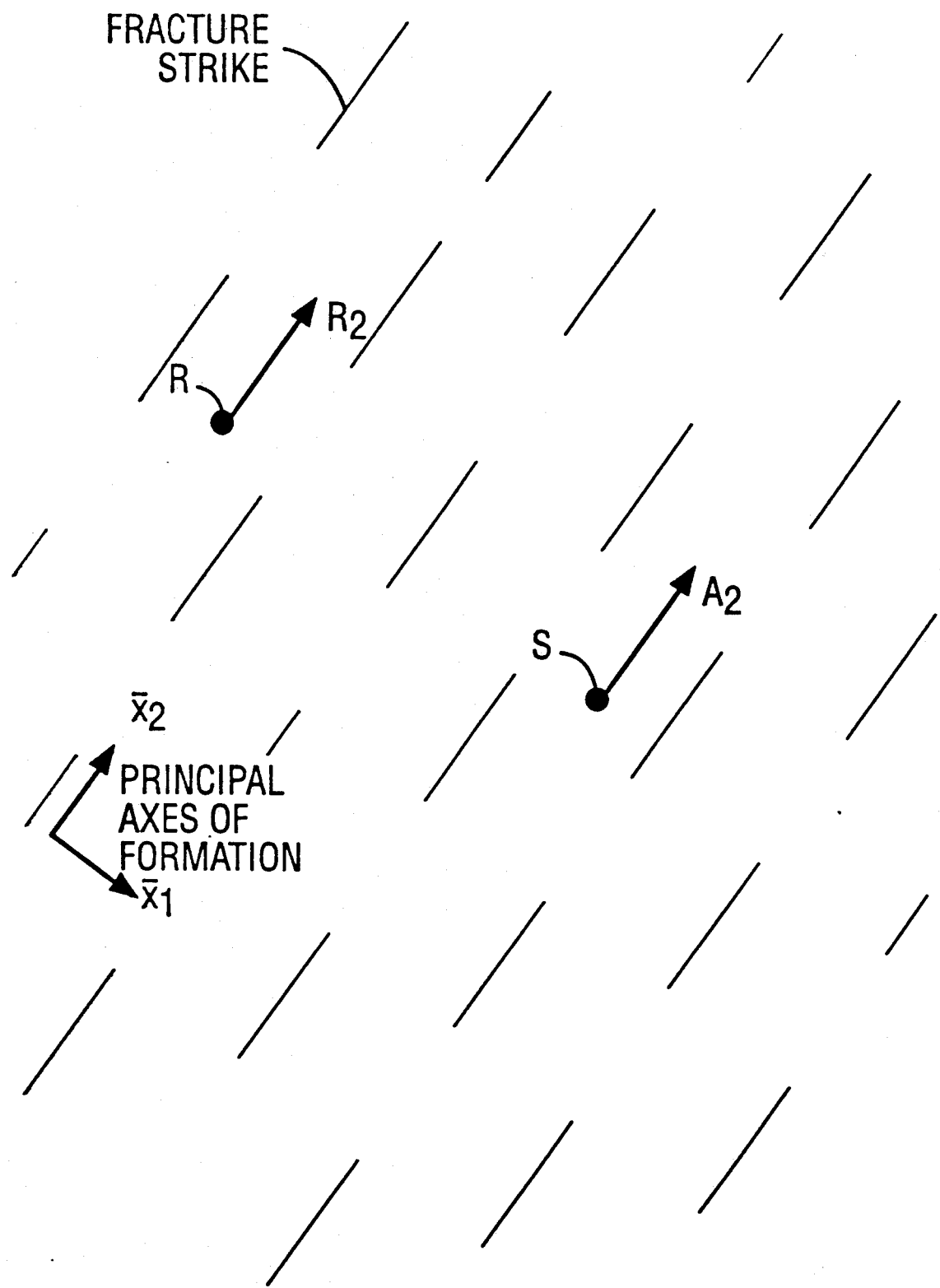
FIG. 2 is a plan view of a seismic source S imparting shear wave energy $\overline{A}_2$ parallel to the $\overline{x}_2$ axis and a seismic receiver R having a horizontal polarization $R_2$ parallel to the $\overline{x}_2$ axis.

Alternatively, if the seismic source S imparts shear wave energy with displacement $\bar{A}_2$ parallel to the $\bar{x}_2$ axis as shown in FIG. 2, a seismic receiver R having a horizontal polarization $R_2$ matching that of the imparted shear wave $\bar{A}_2$ (i.e., parallel to the $\bar{x}_2$ axis) would record the following signal:

$$R_2(t) = A \cdot f_2(t) * w_2(t) * r_2(t) \tag{4}$$

If the seismic receiver R in FIG. 2 were to have a polarization which is orthogonal to that of the imparted shear waves $\bar{A}_2$ (i.e., parallel to axis $\bar{x}_1$) no signal would be recorded, i.e., $R_1(t) = 0$.

If the formation anisotropy is small, the filters $f_1(t)$ and $f_2(t)$ will be similar. For simplicity, one can regard them in this example and other examples below to be equal. Similarly, the seismic source wavelets $w_1(t)$ and $w_2(t)$ may differ under the partial control of the survey operator. Again, for simplicity, one can treat them as equal. One can rewrite the expressions $[f_1(t) * r_1(t)]$ as $r_1(t)$ and $[f_2(t) * r_2(t)]$ as $r_2(t)$.

Figure 3:
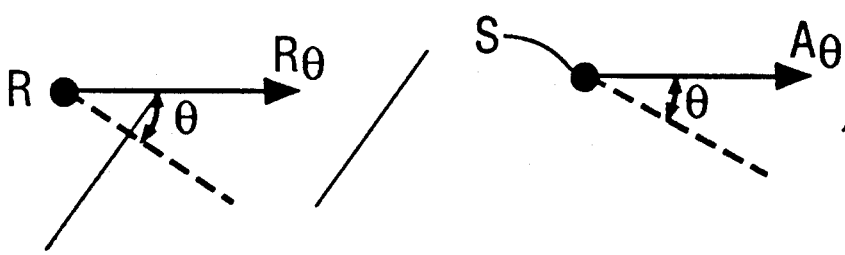
FIG. 3 is a plan view of a seismic source S imparting shear wave seismic energy $\overline{A}_\Theta$ at an oblique angle $\Theta$ to the axis $\overline{x}_1$ of an anisotropic formation and a seismic receiver R having a horizontal polarization $R_\Theta$ at an oblique angle $\Theta$ to the axis $\overline{x}_1$.

In a third example, a seismic source S can impart shear waves having a displacement $\bar{A}_\theta$ at an oblique angle $\theta$ to the principal axis $\bar{x}_1$ as shown in FIG. 3. The natural polarization of the anisotropic formation is indicated by formation principal axes $\bar{x}_1$ and $\bar{x}_2$ as before. Assuming the imparted shear wave to be a vector of magnitude A in the direction $\theta$, it can be expressed in formation coordinates ($\bar{x}_1$, $\bar{x}_2$) as follows:

$$A_\theta = A \cos \theta w(t) x_1 + A \sin \theta w(t) x_2 \tag{5}$$

As the shear wave enters the anisotropic formation, it "splits" into two generally, mutually orthogonal components which conform to the two possible transverse modes of propagation of the anisotropic formation. The rate of separation in time of the split components is dependent upon the differences in velocities along the principal axis of the anisotropic formation.

If the seismic receiver R in FIG. 3 had a horizontal polarization aligned parallel to the $\bar{x}_1$ axis, it would only detect the slower shear wave component as follows:

$$R_1(t) = A \cos \theta \cdot r_1(t) * w(t). \tag{6}$$

If the seismic receiver R in FIG. 3 had a horizontal polarization aligned parallel to the $\bar{x}_2$ direction, it would record only the faster shear wave component as follows:

$$R_2(t) = A \sin \theta \cdot r_2(t) * w(t). \tag{7}$$

As depicted in FIG. 3 with the seismic receiver R, horizontal polarization $R_\Theta$ matching the horizontal polarization of the shear wave source S, the seismic receiver R responds to both components of the shear wave according to the projection of their polarizations onto the seismic receiver polarization. The recorded signal will be:

$$R_\Theta(t) = A \cdot r_1(t) * w(t) \cos^2\Theta + A \cdot r_2(t) * w(t) \sin^2\Theta \tag{8}$$

or more simply a combination of $R_1(t)$ as $R_2(t)$ as previously described in Eqs. (6, 7) as:

$$R_\Theta(t) = R_1(t) \cos \Theta + R_2(t) \sin \Theta \tag{9}$$

Consequently, the source S, imparting shear wave energy polarized predominantly at an oblique angle $\Theta$ to the unique axis, can give rise to two shear wave components.

If the seismic receiver R polarization were orthogonal to the polarization of the source in FIG. 3, it would respond to different projections of both shear wave components, according to their projection onto the seismic receiver polarization. That is, the recorded signals would be as follows:

$$R_\Theta(t) = A \cdot r_1(t) * w(t) \sin \Theta \cos \theta - A \cdot r_2(t) * w(t) \sin \theta \cos \Theta \tag{10}$$

or more simply a combination of $R_1(t)$ and $R_2(t)$ as previously described in Eqs. (6, 7) as:

$$R_0(t) = R_1(t) \sin \Theta - R_2(t) \cos \Theta \tag{11}$$

In a fourth example, if the source generates a P-wave which is converted, at an interface in the earth's subsurface to a shear wave (following conversion principles well-known to those skilled in the art), the resulting shear wave of fixed polarization can be treated similarly as in the third example above. Although such conversion of compressional waves to shear waves requires oblique incidence, in many cases this requires no significant changes from the normal-incidence analysis given above.

B. TORSIONAL SEISMIC SOURCE

The output of a torsional seismic source having a time-varying horizontal polarization can be written:

$$A(t) = Aw(t) \sin (\Psi(t))x + Aw(t) \cos (\Psi(t))y \tag{12}$$

where $\bar{x}$ and $\bar{y}$ are an arbitrary orthogonal coordinate system and $\Psi(t)$ describes the instantaneous polarization of the torsional seismic source as a function of time under the control of the source operator.

The seismic sources described by Eqs. (1) and (2) are special cases of Eq. (12), corresponding to $\Psi(t) = 90°$, and $\Psi(t) = 0°$, respectively, for all times t (i.e., their polarizations are time-invariant). Any arbitrary, horizontal, circularly polarized, torsional source can be constructed with an appropriate $\Psi(t)$ and w(t). The treatment below can be generalized to elliptically polarized, torsional seismic sources by assigning separate wavelets $w_x(t)$ and $w_y(t)$ and separate amplitudes $A_x$ and $A_y$ and if desired, it can also be generalized to non-horizontal, time-varying polarization.

The torsional source can be deployed either on the surface or downhole. One example of practical interest downhole would be a drill bit acting as a torsional source. In this case, $\Psi(t) = \omega \cdot t$, where $\omega$ is the angular frequency of the rotating drill bit.

The output of the torsional source described by Eq. (12) above can be rewritten in terms of the anisotropic formation principal axes $\bar{x}_1$, $\bar{x}_2$ by a simple rotation:

$$A'(t) = \begin{bmatrix} \cos\theta & \sin\theta \\ -\sin\theta & \cos\theta \end{bmatrix} A(t)$$

$$A'(t) = A(\cos\theta \sin \Psi(t) + \sin\theta \cos \Psi(t)) w(t) x_1 + \tag{13}$$
$$A(-\sin\theta \sin \Psi(t) + \cos\theta \cos \Psi(t)) w(t) x_2$$

where $\Theta$ is a measure of the angle between the axes $\bar{x}$ and $\bar{x}_1$.

The components of the shear waves polarized along the axis $\bar{x}_1$ are principal modes traveling with velocity $\beta_1$; those polarized along the axis $\bar{x}_2$ are principal modes traveling with velocity $\beta_2$.

In accordance with one aspect of the present invention, if a pair of seismic receivers having horizontal polarizations $R_1$ and $R_2$ are positioned at generally the same location with their horizontal polarizations oriented along the pricipal axes $\bar{x}_1$ and $\bar{x}_2$ of the anisotropic formation, they would record first and second component seismic signals $R_1'(t)$ and $R_2'(t)$, respectively:

$$R_1'(t) = A[(\cos \Theta \sin \Psi(t) + \sin \Theta \cos \Psi(t)] \cdot r_1(t) * w(t)$$

$$R_2'(t) = A[-\sin\Theta \sin \Psi(t) + \cos \Theta \cos \Psi(t)] \cdot r_2(t) * w(t) \tag{14}$$

More simply, the recorded component seismic signals of Eq. (14) can be expressed in compact notation as:

$$R'(t) = R_1'(t)x_1 + R_2'(t)x_2 \tag{15}$$

In general, the polarizations of receivers ($R_1$ and $R_2$) may be oriented in any two linearly independent directions; the examples cited herein discuss the simplest case of orthogonal orientations.

However, the anisotropic formations' principal axes directions with respect to the axes of the seismic receivers (i.e., $\Theta$) are generally unknown; the determination of their orientation is an objective of the present invention. In fact, the geophones' polarizations can be assumed to be oriented in an orthogonal coordinate system $\bar{x}$, $\bar{y}$ which is at an oblique, yet unknown, angle $\Theta$ to the principal axes ($\bar{x}_1$, $\bar{x}_2$). In this survey frame, the recorded component seismic signals are:

$$R_1(t) = -[A(\cos^2\Theta \sin \Psi(t) + \cos \Theta \sin \Theta \cos \Psi(t))] \cdot r_1(t) * w(t)$$

$$+ [A(\sin^2\Theta \sin \Psi(t) - \cos\Theta \sin \Theta \cos \Psi(t))] \cdot r_2(t) * w(t)$$

$$R_2(t) = -[A(\cos\Theta \sin\Theta \sin\Psi(t) + \sin^2\Theta \cos\Psi(t))]\cdot r_1(t)*w(t)$$

$$+ [A(-\cos\Theta \sin\Theta \sin\Psi(t) + \cos^2\Theta \cos\Psi(t))]\cdot r_2(t)*w(t) \quad (16)$$

It can be seen in the component seismic signals $R_1(t)$ and $R_2(t)$ recorded by the seismic receivers $R_1$ and $R_2$, respectively, each include both principal modes of shear wave propagation, i.e., there are multiple events per reflector. Using compact notation, one can rewrite Eq. (16) as:

$$R(t) = R_1(t)x + R_2(t)y \quad (17)$$

VI. Field Technique Employing Torsional Seismic Sources

This section relates to seismic acquisition and processing techniques which provide methods for ameliorating the effects of shear wave splitting on seismic data as well as detecting of the presence and/or extent of fractured rocks in the subsurface, using seismic recordings obtained with a torsional seismic source. The present invention is intended to include both surface and subsurface methods of seismic exploration. An important aspect of the present invention is to describe a method of seismic exploration employing torsional seismic sources to estimate the azimuthal orientation of the principal axes of subsurface, anisotropic formations and to obtain from the recorded seismic data "principal time-series" signals which are substantially free of the effects of shear wave splitting.

Figure 4:
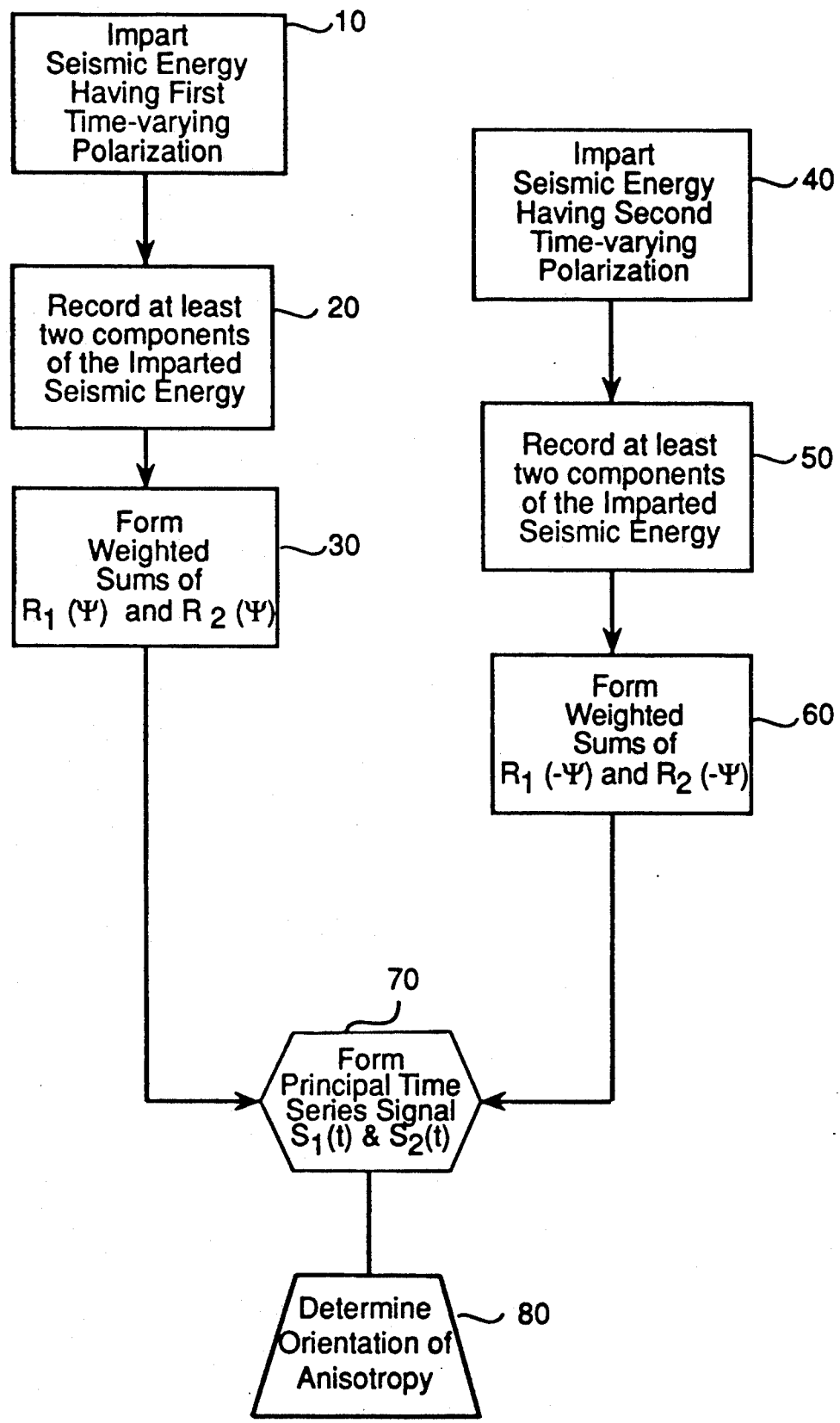
FIG. 4 is a flow diagram of the present invention.

Looking now to FIG. 4, the method of the present invention will be further described. At step 10, shear wave seismic energy, having a time-varying polarization, can be imparted into the earth with a torsional seismic source. Unlike prior techniques which impart shear wave seismic energy, having a fixed polarization, into the earth, the torsional source imparts shear wave seismic energy in all directions in accordance with a selected time-varying polarization. As such, positioning the torsional seismic source so as to impart shear wave seismic energy having a given azimuthal relationship to the principal axes of an anisotropic formation is not required to achieve shear wave splitting. The earth's response thereto is recorded at step 20, with a set of seismic receivers or geophones adapted to record at least two modes of shear wave propagation in anisotropic formations. In particular, either a set of seismic receivers, having their polarizations at an unknown oblique angle $\Theta$ to the principal axes of the anisotropic formation, or a set of seismic receivers having at least first and second linearly independent polarizations at unknown angles $\Theta$ and 90-$\Theta$, respectively (for orthogonal receiver polarizations) to the principal axes can be employed to record a first set of component seismic signals.

In anisotropic formations, each of the recorded component seismic signals can include two separate (but often overlapping) reflection events, both representative of the reflection of the imparted seismic energy from a given seismic reflector. The separate reflection events are the result of the shear wave "splitting" and thus represent different modes or components of propagation of the imparted seismic energy. Although such duplicate information might seem helpful, in fact, it confuses the data, and renders it difficult to interpret.

In a first method to resolve such duplication and resulting confusion at step 30, one can form weighted sums of the component seismic signals $R_1(t)$ and $R_2(t)$ obtained with the set of seismic receivers having at least first and second linearly independent polarizations as described by Eq. (16), at an unknown angle $\Theta$ to the principal axes, according to Eqs. (18, 19):

$$\sin\Theta R_1(t) - \cos\Theta R_2(t) =$$

$$[A(\sin\Theta \sin\Psi(t) - \cos\Theta \cos\Psi(t))]\cdot r_1(t)*w(t) \quad (18)$$

and $$\cos\Theta R_1(t) + \sin\Theta R_2(t) =$$

$$[A(\cos\Theta \sin\Psi(t) + \sin\Theta \cos\Psi(t))]\cdot r_2(t)*w(t) \quad (19)$$

Eqs. (18) and (19) now have combinations of the recorded component seismic signals (on the left) and principal time-series signals (on the right) which contain only one reflection event-per-reflector, i.e., they each represent only one mode of shear wave propagation. However, both sides also contain the unknown angle $\Theta$.

A variety of different means are available for reducing Eqs. (18) and (19) to principal time-series signals independent of the angle $\Theta$. One general method of obtaining the principal time-series signals independent of the angle $\Theta$ is to repeat the previous acquisition with the torsional seismic source polarity reversed at step 40, e.g., by reversing the direction of rotation of the torsional source (i.e., by setting $\Psi(t) \rightarrow -\Psi(t)$). Once again, the earth's response thereto can be recorded with the set of seismic receivers having at least first and second polarizations to obtain a second set of component seismic signals $R_1(t)$ and $R_2(t)$ at step 50. Hereafter, to distinguish the two separate sets of component seismic signals, the first set of component seismic signals $R_1(t)$ and $R_2(t)$ will be labeled as $R_1(\Psi)$ and $R_2(\Psi)$, respectively, and the second set of component seismic signals will be labeled $R_1(-\Psi)$ and $R_2(-\Psi)$. This change in notation is intended to highlight the change in polarity of the torsional source. By similarly weighting and combining at step 60, the second set of component seismic signals can be expressed as:

$$\sin\Theta R_1(-\Psi) - \cos\Theta R_2(-\Psi) =$$

$$[A(-\sin\Theta \sin\Psi(t) - \cos\Theta \cos\Psi(t))]\cdot r_1(t)*w(t) \quad (20)$$

and $$\cos\Theta R_1(-\Psi) - \sin\Theta R_2(-\Psi) =$$

$$[A(-\cos\Theta \sin\Psi(t) - \sin\Theta \cos\Psi(t))]\cdot r_2(t)*w(t) \quad (21)$$

The weighted signals of Eqs. (18) and (20) can be combined at step 70 to yield:

$$\sin\Theta(R_1(\Psi) + R_1(-\Psi)) - \cos\Theta(R_2(\Psi) + R_2(-\Psi))$$

$$= -2A \cos\Theta \Psi(t)\cdot r_1(t)*w(t) \quad (22)$$

Similarly, the weighted signals of Eqs. (19) and (21) can be combined to yield:

$$\cos\Theta(R_1(\Psi) + R_1(-\Psi)) + \sin\Theta(R_2(\Psi) + R_2(-\Psi))$$

$$= 2A \sin\Theta \cos\Psi(t)\cdot r_2(t)*w(t) \quad (23)$$

Finally, the combined signals of Eqs. (22, 23) can then be rearranged to yield principal time-series signals $S_1(t)$ and $S_2(t)$ as follows:

$$S_1(t) = -\tan\theta\left(\frac{R_1(\Psi)+R_1(-\Psi)}{2}\right) + \left(\frac{R_2(\Psi)+R_2(-\Psi)}{2}\right) \quad (24)$$

where $S_1(t) = A[w(t)\cdot\cos\Psi(t)] * f_1(t) * r_1(t)$ and $$S_2(t) = \cot\theta\left(\frac{R_1(\Psi)+R_1(-\Psi)}{2}\right) + \left(\frac{R_2(\Psi)+R_2(-\Psi)}{2}\right) \quad (25)$$

where $S_2(t) = A[w(t)\cdot\cos\Psi(t)] * f_2(t) * r_2(t)$

Each of the principal time-series signals $S_1(t)$ and $S_2(t)$ represents a seismic signal having one reflection eventper-reflector (not including multiples), i.e., it is free of the shear wave splitting effects and is independent of the angle $\Theta$. Moreover, each of the principal time series signals $S_1(t)$ and $S_2(t)$ now represents essentially the properties of the anisotropic formation along a principal axis thereof. The right sides of Eqs. 24 and 25 contain an average of the recorded component seismic signals $R_1(\Psi)$ and $R_1(-\Psi)$, i.e., $$R_1 = \tfrac{1}{2}(R_1(\Psi) + R_1(-\Psi)) \quad (26)$$

and of the component seismic signals $R_2(\Psi)$ and $R_2(-\Psi)$ $$R_2 = \tfrac{1}{2}(R_2(\Psi) + R_2(-\Psi)) \quad (27)$$

The principal time-series signal $S_1(t)$ in Eq. (24) can thus be simplified according to:

$$S_1(t) = -\tan\Theta R_1(t) + R_2(t) \quad (28)$$

Similarly, one can simplify the second principal time-series signal $S_2(t)$ in Eq. (25) according to:

$$S_2(t) = \cot\Theta R_1(t) + R_2(t) \quad (29)$$

In fact, Eqs. (11) and (19) and (20) permit finding the principal time-series for special cases of $w(t)$ and $\Psi(t)$, which can rely on special features of these functions and not require the polarity-reversed process described above.

Should a priori knowledge exist regarding the azimuthal relationship between formation principal axes and seismic receiver polarizations (i.e., the angle $\Theta$), the azimuthal dependency in the principal time-series signals $S_1(t)$ and $S_2(t)$ can be deduced directly.

At step 80, if the azimuthal angle $\Theta$ is not known independently, it can be estimated by recognizing that (1) $\Theta$ is independent of time, and (2) that $r_2(t)$ can be physically related to $r_1(t)$. In particular, it may be assumed on physical grounds that $r_2(t)$ is just a stretched version of $r_1(t)$ according to:

$$r_2(t) = r_1(t(1+\gamma)) \quad (30)$$

where $\gamma(t)$ is the average anisotropy down to time t (a smooth function of t).

Then one may simply calculate a plurality of principal time-series signals $S_1(t)$ and $S_2(t)$ by assuming different values of $\Theta$ (e.g., $\Theta = 0, 10, 20, 30, 40, 50, 60, 70, 80, 90$) and selecting the angle $\Theta$ for which $S_2(t)$ appears visually, or by optimizing some calculated quantity, as a stretched version of $S_1(t)$. The trial value of $\Theta$ which produces this result will be close to the actual orientation angle $\Theta$. More analytically, one can implement this technique using the approximation technique described in Thomsen U.S. Pat. No. 4,888,743, incorporated by reference herein. Once the principal time-series signals $S_1(t)$ and $S_2(t)$, independent of the angle $\Theta$, are found, either one is better, for structural interpretation, than was the original recorded seismic data, since each has only one event-per-reflector. Furthermore, differences in the two principal time-series signals gives information about anisotropy, and its distribution with depth.

Alternatively, if seismic receivers having only one polarization at an oblique angle $\Theta$ to a principal axis of the anisotropic formation are employed at either step 20 or 50, either the component seismic signal $R_1(t)$ or $R_2(t)$, as described in Eq. 16, will be recorded. However, both component seismic signals includes at least two modes of shear wave propagation of the imparted seismic energy.

Here again, if a priori knowledge exists regarding the azimuthal relationship between formation principal axes and the seismic receiver polarization, the azimuthal dependency of either $R_1(t)$ or $R_2(t)$ in Eq. 16 can be deduced and either the principal time-series signals $S_1(t)$ or $S_2(t)$ can be obtained. Alternatively, by simply assuming different values for $\Theta$ and recalling the scaled and stretched relationship between $r_1(t)$ and $r_2(t)$ the principal time-series signal $S_1(t)$ or $S_2(t)$ can be determined.

Having thus described the present invention employing a torsional seismic source in combination with sets of seismic receivers adapted to record both the fast and slow modes of propagation of shear wave seismic energy in an anisotropic formation and methods for ameliorating the effects of shear wave splitting, other modifications and improvements thereto may become apparent to others skilled in the art. However, the present invention is to be limited only by the claims attached herewith.

We claim:

1. A method of geophysical exploration comprising the steps of:
   (a) imparting seismic energy into the earth's subsurface formations with a source having a first time-varying polarization:
   (b) recording a first set of seismic signals with seismic receivers having at least first and second linearly independent polarizations including at least one mode of shear wave propogation; and
   (c) forming a weighted sum of the first set of seismic signals to ameliorate the effects of shear wave birefringence and to obtain principal time-series signals.

2. The method of claim 1, further including the steps of:
   (a) imparting seismic energy into the earth's subsurface formations with a source having a second time-varying polarization
   (b) recording a second set of seismic signals representative of the earth's response to first and second modes of propagation of the imparted seismic energy; and (c) processing the first and second sets of seismic signals to ameliorate the effects of shear wave birefringence and to obtain principal time-series signals.

3. The method of claim 1, wherein the seismic energy is imparted with a torsional seismic source.

4. The method of claim 2, wherein the second time-varying polarization is a time-shifted function of the first time-varying polarization.

5. A method of geophyscial exploration, comprising the steps of:
   (a) imparting shear wave energy into the earth's subsurface formations with a torsional seismic source having a time-varying polarization and
   (b) recording seismic signals with sets of seismic receivers having first and second linearly independent polarizations $R_1$ and $R_2$, respectively and include at least one mode of shear wave propogation; and
   (c) combining as a weighted sum signals $R_1(t)$ and $R_2(t)$ to ameliorate the effects of shear wave birefringence and to obtain principal time-series signals.

6. The method of claim 5 wherein the torsional source imparts circular, horizontally polarized shear waves.

7. The method of claim 5, wherein the torsional source imparts elliptical, horizontally polarized shear waves.

8. The method of claim 5, wherein the the imparted shear wave energy is recorded with a first set of seismic receivers having their polarizations at an oblique angle to a principal axis of a subsurface anisotropic formation.

9. A method of geophysical exploration employing torsional seismic sources and sets of seismic receivers having at least two polarizations, comprising the steps of:
   (a) recording a first set of seismic signals $R_1(\Psi)$ and $R_2(\Psi)$ with the set of seismic receivers representative of the earth's response to seismic energy imparted into the earth with the torsional seismic source having a first polarity;
   (b) recording a second set of seismic signals $R_1(-\Psi)$ and $R_2(-\Psi)$ with the set of seismic receivers representative of the earth's response to seismic energy imparted with a torsional seismic source having a second polarity;
   (c) combining the first set of seismic signals $R_1(\Psi)$ and $R_2(-\Psi)$ to obtain a first set of principal time-series signals;
   (d) combining a second set of seismic signals $R_1(-\Psi)$ and $R_2(-\Psi)$ to obtain a second set of principal time-series signals.

10. The method of claim 9, wherein the first and second polarities of the torsional seismic source are opposite.

11. The method of claim 9, wherein the direction of rotation of the torsional seismic source is reversed.

12. The method of claim 9, further including the steps of:
   (a) combining the first and second set of seismic signals to obtain first principal time-series signals $S_1(t)$ according to:

$$S_1(t) = -\tan\theta \left( \frac{R_1(\Psi) + R_1(-\Psi)}{2} \right) + \left( \frac{R_2(\Psi) + R_2(-\Psi)}{2} \right)$$

(b) combining the first and second set of seismic signals to obtain a second principal time-series signals $S_2(t)$ according to:

$$S_2(t) = \cot\theta \left( \frac{R_1(\Psi) + R_1(-\Psi)}{2} \right) + \left( \frac{R_2(\Psi) + R_2(-\Psi)}{2} \right)$$

where $\Theta$ = an angle representative angular relation between.

13. The method of claim 12 further including the steps of:
   (a) evaluating principal time-series signals $S_1(t)$ and $S_2(t)$ for a plurality of assumed angles $\Theta$; and
   (b) estimating the unknown angle $\Theta$ to be the assumed angle $\Theta$ which relates the principal time-series signals $S_1(t)$ and $S_2(t)$.

14. A method of geophysical exploration, comprising the steps of:
   (a) imparting shear wave energy into the earth's subsurface formations with a source having a first time-varying polarization and recording a first set of signals representative of the earth's response thereto with receivers having at least first and second linearly independent polarizations including at least one mode of shear wave propagation and
   (b) imparting shear wave energy into the earth's subsurface formations with a source having a second time-varying polarization and recording a second set of signals representative of the earth's response thereto with receivers having at least first and second linearly independent polarizations including at least one mode of shear wave propagation; and
   combining the first and second sets of signals to ameliorate the effect of shear wave birefringence and to obtain principal time-series signals.

15. The method of claim 14, wherein the first and second time-varying polarizations have opposite polarities.

16. The method of claim 14, wherein the second time-varying polarizations is a time-shifted function of the first time-varying polarization.

* * * * *

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al.

It is certified that error appears in the above-indentified patent and that said Letters Patent is hereby corrected as shown below:

| Col. | Line | | |
|---|---|---|---|
| 4 | 15 | "$r_i(t)=f_i(t)*r_i(t)$" should read | --$\tilde{r}_i(t)=f_i(t)*r_i(t)$-- |
| 5 | 68 | "$A_1=A \cdot w_1(t)x_1$" should read | --$\overline{A}_1=A \cdot w_1(t)\overline{x}_1$-- |
| 6 | 15 | "$A_2=A \cdot w_2(t)x_2$" should read | --$\overline{A}_2=A \cdot w_2(t)\overline{x}_2$-- |
| 6 | 50 | "$r_1(t)$ and $[f_2(t)*r_2(t)]$ as $r_2(t)$" should read --$\tilde{r}_1(t)$ and $[f_2(t)*r_2(t)]$ as $\tilde{r}_2(t)$-- | |
| 6 | 60 | "$A_\theta=A\cos\theta w(t)x_1+A\sin\theta w(t)x_2$" should read --$\overline{A}_\theta=A\cos\theta w(t)\overline{x}_1+A\sin\theta w(t)\overline{x}_2$-- | |
| 7 | 5 | "$R_1(t)=A\cos\theta \cdot r_1(t)*w(t)$" should read --$R_1(t)=A\cos\theta \cdot \tilde{r}_1(t)*w(t)$-- | |

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al It is certified that error appears in the above-indentified patent and that said Letters Patent is hereby corrected as shown below:

| Col. | Line | |
|---|---|---|
| 7 | 11 | "$R_2(t) = A\sin\theta \cdot r_2(t) * w(t)$" should read --$R_2(t) = A\sin\theta \cdot \tilde{r}_2(t) * w(t)$-- |
| 7 | 21 | "$R_\theta(t) = A \cdot r_1(t) * w(t)\cos^2\theta + A \cdot r_2(t) * w(t)\sin^2\theta$" should read --$R_\theta(t) = A \cdot \tilde{r}_1(t) * w(t)\cos^2\theta + A \cdot \tilde{r}_2(t) * w(t)\sin^2\theta$-- |
| 7 | 39 | "$R_\theta(t) = A \cdot r_1(t) * w(t)\sin\theta\cos\theta - A \cdot r_2(t) * w(t)\sin\theta\cos\theta$" should read --$R_\theta(t) = A \cdot \tilde{r}_1(t) * w(t)\sin\theta\cos\theta - A \cdot \tilde{r}_2(t) * w(t)\sin\theta\cos\theta$-- |
| 7 | 61 | "$A(t) = Aw(t)\sin(\gamma(t))x + Aw(t)\cos(\gamma(t))y$" should read --$\overline{A}(t) = Aw(t)\sin(\gamma(t))\overline{x} + Aw(t)\cos(\gamma(t))\overline{y}$-- |

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al.

It is certified that error appears in the above-indentified patent and that said Letters Patent is hereby corrected as shown below:

| Col. | Line | | | |
|------|------|------|------|------|
| 8 | 20 | "A'(t)" | should read | --$\overline{A}'(t)$-- |
| 8 | 20 | "A(t)" | should read | --$\overline{A}(t)$-- |
| 8 | 24 | "A'(t)" | should read | --$\overline{A}'(t)$-- |
| 8 | 24 | "$x_1$" | should read | --$\overline{x}_1$-- |
| 8 | 25 | "$x_2$" | should read | --$\overline{x}_2$-- |
| 8 | 42 | "$r_1$" | should read | --$\tilde{r}_1$-- |
| 8 | 43 | "$r_2$" | should read | --$\tilde{r}_2$-- |
| 8 | 48 | "$x_1$" | should read | --$\overline{x}_1$-- |

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al.

It is certified that error appears in the above-indentified patent and that said Letters Patent is hereby corrected as shown below:

| Col. | Line | | |
|---|---|---|---|
| 8 | 48 | "R" should read | $--\bar{R}'--$ |
| 8 | 48 | "$x_2$" should read | $--\bar{x}_2--$ |
| 8 | 65 | "$r_1$" should read | $--\tilde{r}_1--$ |
| 8 | 67 | "$r_2$" should read | $--\tilde{r}_2--$ |
| 9 | 2 | "$r_1$" should read | $--\tilde{r}_1--$ |
| 9 | 5 | "$r_2$" should read | $--\tilde{r}_2--$ |
| 9 | 14 | "$R(t)=R_1(t)x+R_2(t)y$" should read $--\bar{R}_1(t)=R_1(t)\bar{x}+R_2(t)\bar{y}--$ | |
| 10 | 11 | "$r_1$" should read | $--\tilde{r}_1--$ |
| 11 | 40 | "$R_1$" should read | $--\bar{R}_1--$ |

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al.

It is certified that error appears in the above-indentified patent and that said Letters Patent is hereby corrected as shown below:

| Col. | Line | | | |
|---|---|---|---|---|
| 10 | 16 | "$r_2$" | should read | --$\tilde{r}_2$-- |
| 10 | 48 | "$r_1$" | should read | --$\tilde{r}_1$-- |
| 10 | 55 | "$r_2$" | should read | --$\tilde{r}_2$-- |
| 10 | 61 | "$r_1$" | should read | --$\tilde{r}_1$-- |
| 10 | 68 | "$r_2$" | should read | --$\tilde{r}_2$-- |
| 11 | 21 | "eventper-reflector" | should read | --event-per-reflector-- |
| 11 | 30 | "$R_1$" | should read | --$\overline{R}_1$-- |

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al.

It is certified that error appears in the above-indentified patent and that said Letters Patent is hereby corrected as shown below:

| Col. | Line | | |
|------|------|------|------|
| 11 | 35 | "$R_2$" should read | --$\overline{R}_2$-- |
| 11 | 40 | "$R_2$" should read | --$\overline{R}_2$-- |
| 11 | 45 | "$S_2(t)=\cot \theta R_1(t)+R_2(t)$" should read | --$S_2(t)=\cot \theta R_1(t)+\overline{R}_2(t)$--. |
| 11 | 63 | "$\gamma$" should read | --$\overline{\gamma}$-- |
| 11 | 65 | "$\gamma(t)$" should read | --$\overline{\gamma}(t)$-- |

Signed and Sealed this

Eleventh Day of July, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al.

It is certified that error appears in the above-indentified patent and that said Letters Patent is hereby corrected as shown below:

| Col. | Line | |
|---|---|---|
| 4 | 15 | "$r_i(t)=f_i(t)*r_i(t)$" should read --$\tilde{r}_i(t)=f_i(t)*r_i(t)$-- |
| 5 | 68 | "$A_1=A \cdot w_1(t)x_1$" should read --$\overline{A}_1=A \cdot w_1(t)\overline{x}_1$-- |
| 6 | 15 | "$A_2=A \cdot w_2(t)x_2$" should read --$\overline{A}_2=A \cdot w_2(t)\overline{x}_2$-- |
| 6 | 50 | "$r_1(t)$ and $[f_2(t)*r_2(t)]$ as $r_2(t)$" should read --$\tilde{r}_1(t)$ and $[f_2(t)*r_2(t)]$ as $\tilde{r}_2(t)$-- |
| 6 | 60 | "$A_\theta=A\cos\theta w(t)x_1+A\sin\theta w(t)x_2$" should read --$\overline{A}_\theta=A\cos\theta w(t)\overline{x}_1+A\sin\theta w(t)\overline{x}_2$-- |
| 7 | 5 | "$R_1(t)=A\cos\theta \cdot r_1(t)*w(t)$" should read --$R_1(t)=A\cos\theta \cdot \tilde{r}_1(t)*w(t)$-- |

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al It is certified that error appears in the above-indentified patent and that said Letters Patent is hereby corrected as shown below:

| Col. | Line | |
|---|---|---|
| 7 | 11 | "$R_2(t) = A\sin\theta \cdot r_2(t) * w(t)$" should read --$R_2(t) = A\sin\theta \cdot \tilde{r}_2(t) * w(t)$-- |
| 7 | 21 | "$R_\theta(t) = A \cdot r_1(t) * w(t) \cos^2\theta + A \cdot r_2(t) * w(t) \sin^2\theta$" should read --$R_\theta(t) = A \cdot \tilde{r}_1(t) * w(t) \cos^2\theta + A \cdot \tilde{r}_2(t) * w(t) \sin^2\theta$-- |
| 7 | 39 | "$R_\theta(t) = A \cdot r_1(t) * w(t) \sin\theta\cos\theta - A \cdot r_2(t) * w(t) \sin\theta\cos\theta$" should read --$R_\theta(t) = A \cdot \tilde{r}_1(t) * w(t) \sin\theta\cos\theta - A \cdot \tilde{r}_2(t) * w(t) \sin\theta\cos\theta$-- |
| 7 | 61 | "$A(t) = Aw(t) \sin(\gamma(t)) x + Aw(t) \cos(\gamma(t)) y$" should read --$\overline{A}(t) = Aw(t) \sin(\gamma(t)) \overline{x} + Aw(t) \cos(\gamma(t)) \overline{y}$-- |

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al.

It is certified that error appears in the above-indentified patent and that said Letters Patent is hereby corrected as shown below:

| Col. | Line | | | |
|---|---|---|---|---|
| 8 | 20 | "A'(t)" | should read | $--\overline{A}'(t)--$ |
| 8 | 20 | "A(t)" | should read | $--\overline{A}(t)--$ |
| 8 | 24 | "A'(t)" | should read | $--\overline{A}'(t)--$ |
| 8 | 24 | "$x_1$" | should read | $--\overline{x}_1--$ |
| 8 | 25 | "$x_2$" | should read | $--\overline{x}_2--$ |
| 8 | 42 | "$r_1$" | should read | $--\tilde{r}_1--$ |
| 8 | 43 | "$r_2$" | should read | $--\tilde{r}_2--$ |
| 8 | 48 | "$x_1$" | should read | $--\overline{x}_1--$ |

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al.

It is certified that error appears in the above-indentified patent and that said Letters Patent is hereby corrected as shown below:

| Col. | Line | | |
|---|---|---|---|
| 8 | 48 | "R" should read | $\bar{R}$ |
| 8 | 48 | "x$_2$" should read | $\bar{x}_2$ |
| 8 | 65 | "r$_1$" should read | $\tilde{r}_1$ |
| 8 | 67 | "r$_2$" should read | $\tilde{r}_2$ |
| 9 | 2 | "r$_1$" should read | $\tilde{r}_1$ |
| 9 | 5 | "r$_2$" should read | $\tilde{r}_2$ |
| 9 | 14 | "R(t)=R$_1$(t)x+R$_2$(t)y" should read | $\bar{R}_1(t)=R_1(t)\bar{x}+R_2(t)\bar{y}$ |
| 10 | 11 | "r$_1$" should read | $\tilde{r}_1$ |
| 11 | 40 | "R$_1$" should read | $\bar{R}_1$ |

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al.

It is certified that error appears in the above-indentified patent and that said Letters Patent is hereby corrected as shown below:

| Col. | Line | | | |
|---|---|---|---|---|
| 10 | 16 | "$r_2$" | should read | --$\tilde{r}_2$-- |
| 10 | 48 | "$r_1$" | should read | --$\tilde{r}_1$-- |
| 10 | 55 | "$r_2$" | should read | --$\tilde{r}_2$-- |
| 10 | 61 | "$r_1$" | should read | --$\tilde{r}_1$-- |
| 10 | 68 | "$r_2$" | should read | --$\tilde{r}_2$-- |
| 11 | 21 | "eventper-reflector" | should read | --event-per-reflector-- |
| 11 | 30 | "$R_1$" | should read | --$\bar{R}_1$-- |

UNITED STATES PATENT AND TRADEMARK OFFICE
CERTIFICATE OF CORRECTION

PATENT NO. : 5,136,554
DATED : August 4, 1992
INVENTOR(S) : Leon A. Thomsen, et al.

It is certified that error appears in the above-indentified patent and that said Letters Patent is hereby corrected as shown below:

| Col. | Line | | |
|---|---|---|---|
| 11 | 35 | "$R_2$" should read | --$\overline{R}_2$-- |
| 11 | 40 | "$R_2$" should read | --$\overline{R}_2$-- |
| 11 | 45 | "$S_2(t)=\cot \theta R_1(t)+R_2(t)$" should read | --$S_2(t)=\cot \theta \overline{R}_1(t)+\overline{R}_2(t)$--. |
| 11 | 63 | "$\gamma$" should read | --$\overline{\gamma}$-- |
| 11 | 65 | "$\gamma(t)$" should read | --$\overline{\gamma}(t)$-- |

This certificate supersedes certificate of correction issued July 11, 1995.

Signed and Sealed this

Fifth Day of September, 1995

Attest:

BRUCE LEHMAN

*Attesting Officer*     *Commissioner of Patents and Trademarks*